(12) United States Patent
Castro et al.

(10) Patent No.: US 12,095,500 B2
(45) Date of Patent: *Sep. 17, 2024

(54) METHODS FOR ESTIMATING MODAL BANDWIDTH SPECTRAL DEPENDENCE

(71) Applicant: Panduit Corp., Tinley Park, IL (US)

(72) Inventors: Jose M. Castro, Naperville, IL (US); Richard J. Pimpinella, Frankfort, IL (US); Bulent Kose, Burr Ridge, IL (US); Brett Lane, Hinsdale, IL (US); Yu Huang, Orland Park, IL (US); Asher S. Novick, New York, NY (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,682

(22) Filed: Jul. 21, 2023

(65) Prior Publication Data
US 2023/0361870 A1 Nov. 9, 2023

Related U.S. Application Data

(63) Continuation of application No. 17/583,357, filed on Jan. 25, 2022, now Pat. No. 11,711,143, which is a
(Continued)

(51) Int. Cl.
*H04B 10/073* (2013.01)
*G01M 11/00* (2006.01)
(Continued)

(52) U.S. Cl.
CPC ....... *H04B 10/0731* (2013.01); *G01M 11/338* (2013.01); *H04B 10/07951* (2013.01); *H04B 10/2581* (2013.01)

(58) Field of Classification Search
CPC .......................... H04B 10/0731; G01M 11/338
See application file for complete search history.

(56) References Cited

U.S. PATENT DOCUMENTS

| 11,233,563 B2 | 1/2022 | Castro et al. |
| 11,711,143 B2 * | 7/2023 | Castro .............. H04B 10/07951 356/73.1 |

(Continued)

FOREIGN PATENT DOCUMENTS

| CN | 102488367 A | 5/2012 |
| EP | 2207022 A1 | 7/2010 |

(Continued)

OTHER PUBLICATIONS

Pimpinella, R. et al., Wavelength Dependence of Effective Modal Bandwidth in OM3 and OM4 Fiber and Optimizing Multimode Fiber for Multi-Wavelength Transmission, Proceedings of the 63rd IWCS Conference, 2014, pp. 349-354.

*Primary Examiner* — Nathan M Cors
(74) *Attorney, Agent, or Firm* — Christopher K. Marlow; Christopher S. Clancy; James H. Williams

(57) ABSTRACT

Methods for estimating the Effective Modal Bandwidth (EMB) of laser optimized Multimode Fiber (MMF) at a specified wavelength, $\lambda_S$, based on the measured EMB at a first reference measurement wavelength, $\lambda_M$. In these methods the Differential Mode Delay (DMD) of a MMF is measured and the Effective Modal Bandwidth (EMB) is computed at a first measurement wavelength. By extracting signal features such as centroids, peak power, pulse widths, and skews, as described in this disclosure, the EMB can be estimated at a second specified wavelength with different degrees of accuracy. The first method estimates the EMB at the second specified wavelength based on measurements at the reference wavelength. The second method predicts if the EMB at the second specified wavelength is equal or greater than a specified bandwidth limit.

6 Claims, 18 Drawing Sheets

Related U.S. Application Data continuation of application No. 17/161,116, filed on Jan. 28, 2021, now Pat. No. 11,233,563, which is a continuation of application No. 16/341,536, filed as application No. PCT/US2017/055307 on Oct. 5, 2017, now abandoned.

(60) Provisional application No. 62/407,695, filed on Oct. 13, 2016.

(51) Int. Cl.
  *H04B 10/079* (2013.01)
  *H04B 10/2581* (2013.01)

(56) References Cited

U.S. PATENT DOCUMENTS

| | | | |
|---|---|---|---|
| 2010/0315620 A1 | 12/2010 | Pimpinella et al. | |
| 2011/0054861 A1 | 3/2011 | Lane | |
| 2011/0200325 A1* | 8/2011 | Kobyakov | H04B 7/0413 |
| | | | 398/118 |
| 2012/0099099 A1 | 4/2012 | Tudury et al. | |
| 2014/0318188 A1 | 10/2014 | Bowker et al. | |
| 2014/0319354 A1* | 10/2014 | Chen | H04B 10/0731 |
| | | | 250/341.1 |
| 2014/0368809 A1* | 12/2014 | Chen | G01M 11/335 |
| | | | 356/73.1 |
| 2016/0025923 A1 | 1/2016 | Castro et al. | |
| 2016/0041332 A1 | 2/2016 | Castro et al. | |
| 2017/0176285 A1* | 6/2017 | Molin | G01M 11/338 |
| 2017/0331549 A1 | 11/2017 | Molin et al. | |
| 2018/0359025 A1* | 12/2018 | Molin | H04B 10/0775 |

FOREIGN PATENT DOCUMENTS

| | | |
|---|---|---|
| JP | 2005107514 A | 4/2005 |
| WO | 2015056044 A1 | 4/2015 |
| WO | 2015128691 A1 | 9/2015 |
| WO | 2016034913 A1 | 3/2016 |
| WO | 2016087892 A1 | 6/2016 |

\* cited by examiner

Example of alpha refractive index profile (black trace). Propagation constants for guided mode groups are shown as dot markers.

Example of alpha refractive index profile for a bend insensitive MMF with a trench close to the core (black trace).

Flow Diagram for Training Method

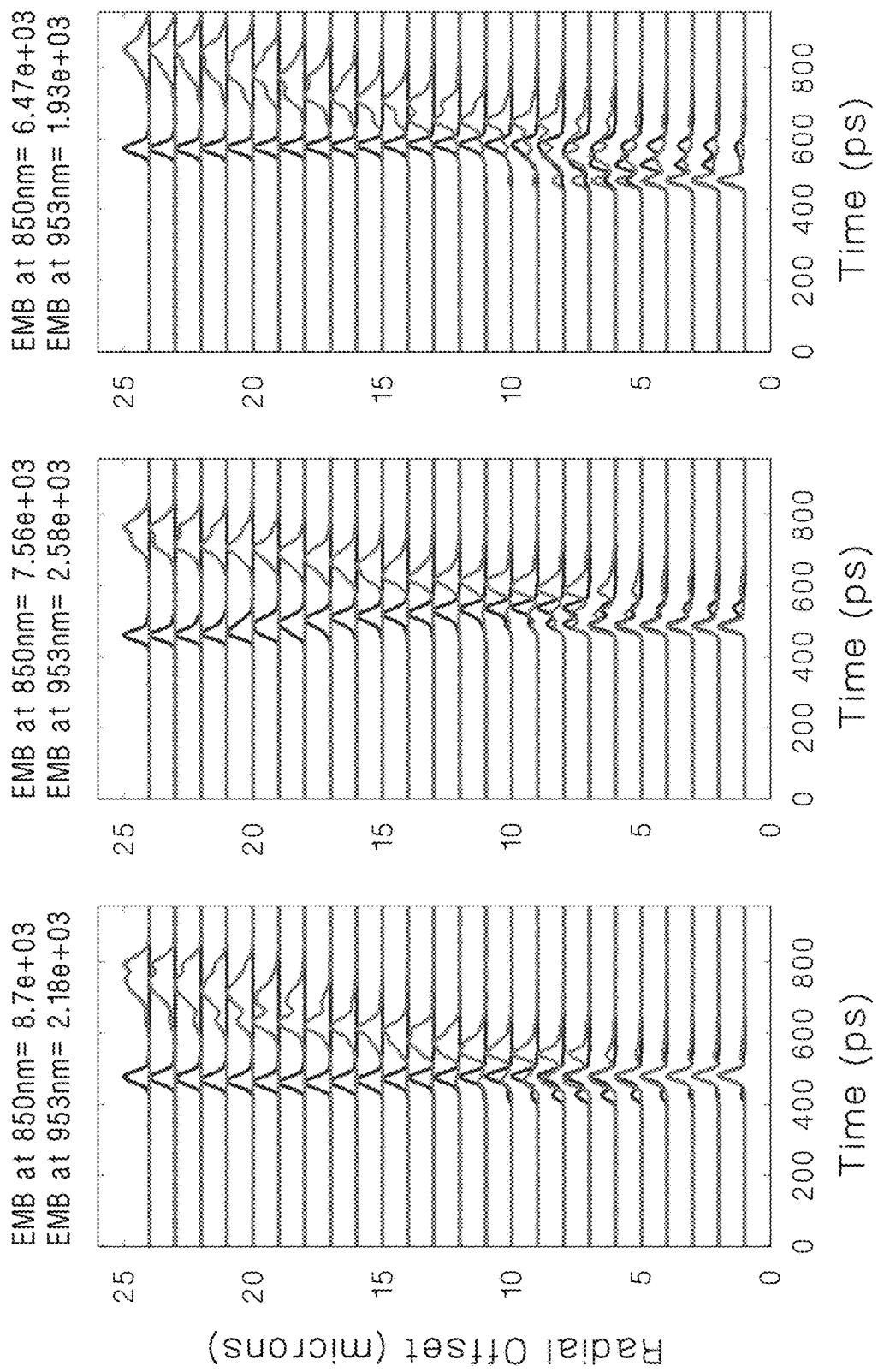

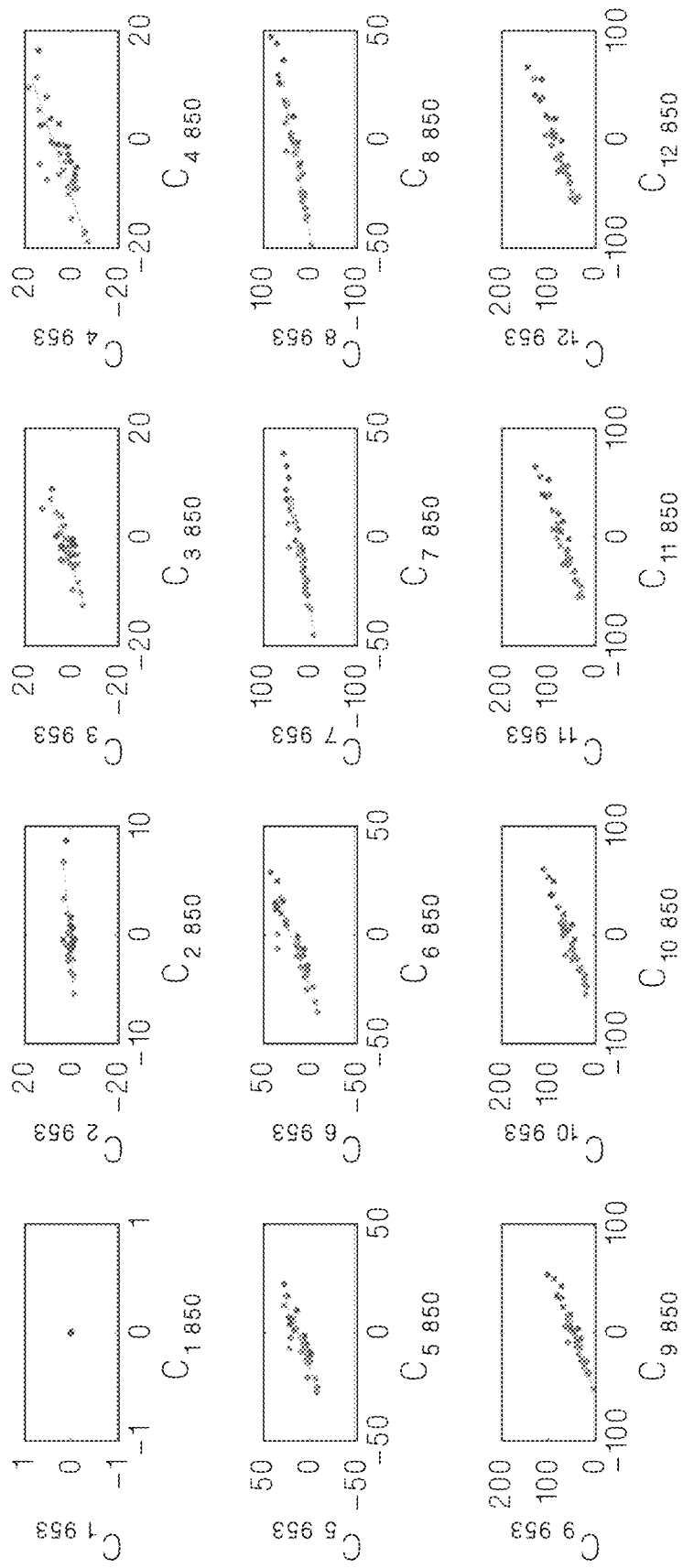

Centroid features for A and B population for each radial offsets (13-24 microns offset)

Peak position features for A and B population for each radial offsets (1-12 microns offset)

Peak position features for A and B population for each radial offsets (13-24 microns offset)

$G_c$ and $G_p$ functions as a function of radial offset for A and B populations.

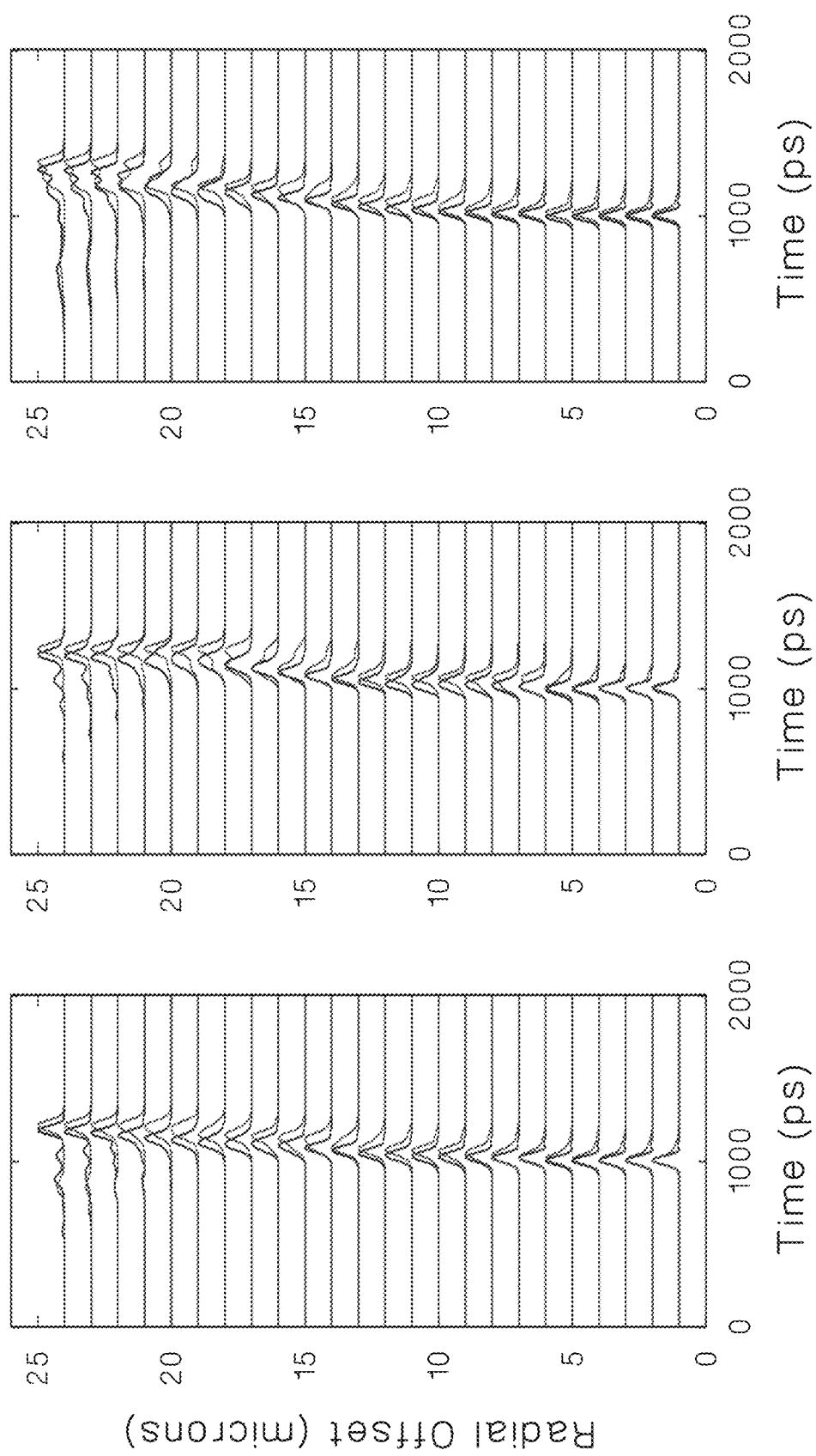

Results for the classification of fibers belonging to Group 1 and Group 2 using disclosed method 2. (a) After the first iteration, all populations are mixed, (b) 1000 iterations, (c) 2000 iterations, (d) 3000 iterations, (e) 4000 iterations, (f) 5000 iterations, (g) 6000 iterations, (h) 8000 iterations. (i) After 9000 iterations, populations it is possible to classify the two groups

METHODS FOR ESTIMATING MODAL BANDWIDTH SPECTRAL DEPENDENCE

CROSS REFERENCES TO RELATED APPLICATIONS

This application is a continuation of U.S. patent application Ser. No. 17/583,357, filed Jan. 25, 2022, which is a continuation of U.S. patent application Ser. No. 17/161,116, filed Jan. 28, 2021, which issued as U.S. Pat. No. 11,233,563 on Jan. 25, 2022, which is a continuation of U.S. patent application Ser. No. 16/341,536, filed Apr. 12, 2019, which is a U.S. National Stage Application under 35 U.S.C. § 371 of International Application No. PCT/US2017/055307, filed Oct. 5, 2017, which claims priority to U.S. Provisional Application No. 62/407,695, filed Oct. 13, 2016, the subject matter of which is hereby incorporated by reference in its entirety.

BACKGROUND OF THE INVENTION

The present invention relates in general to the field of optical fibers and more specifically, to multimode fibers (MMF) designed for operation at multiple wavelengths. The present invention also relates to the field of modeling, designing, production, sorting and testing of MMFs. More specifically it relates to the estimation of the MMF EMB at multiple wavelengths.

The invention is also related to modal and chromatic dispersion compensation in Vertical Cavity Surface Emitting Laser (VCSEL) based MMF channels [1]. The methods described here can provide an estimation of the skew in radial DMD pulse waveforms (tilt) at different wavelengths which is critical in the field of modal-chromatic dispersion compensation.

The need for higher bandwidth has been mainly driven by the increasing demand for high speed backbone data aggregation fueled by video transmission, server applications, virtualization, and other emerging data services. Cost, power consumption, and reliability advantages have favored the predominance of short and intermediate reach optical channels employing transmitters utilizing VCSELs operating at 850 nm over MMF. MMF is currently utilized in more than 85% of datacenter installations and has a larger core diameter than single-mode fiber (SMF), which reduces connection losses, relaxes alignment tolerances, and reduces connectorization cost.

Recently, new modulation technologies for VCSEL-MMF channels such as PAM-4, and Short Wavelength Division Multiplexing (SWDM) [SWDM alliance], have been proposed in order to increase the data rates. Standards organizations, including the Institute of Electrical and Electronics Engineers (IEEE) working group 802.3cd and the T11 Technical Committee within the International Committee for Information Technology Standards (INCITS) PI-7, are already working on new applications for PAM-4 for optical serial rates over 50 Gb/s per wavelength.

The SWDM concept is similar to the Coarse Wavelength Division Multiplexing (CWDM), already used for SMF channels operating in the 1310 nm spectral region. SWDM requires the specification of the minimum EMB at the wavelengths limits of the operating spectrum (e.g., 850 nm and 953 nm).

The EMB is computed from DMD pulse measurements. The DMD test method, specified within standards organizations [2], describes a procedure for launching a temporally short and spectrally narrow pulse (reference pulse) from a SMF into the core of a MMF at several radial offsets [5]. After propagating through the MMF under test, the pulses are received by a fast photodetector which captures all the MMF core power. The EMB is estimated by the Fourier domain deconvolution of the input pulse from a weighted sum of the received signals for each radial offset launch. The set of weight values utilized in the computation belong to a set of ten representative VCSELs described elsewhere [2]. Due to the test complexity, it is time consuming, and the equipment required to perform the test is expensive; EMB test requirements for multiple wavelengths will significantly increase testing time and consequently, increase fiber cost. A method to estimate the EMB from measurements at a single wavelength would, therefore, reduce testing time and cost. The challenges to achieve such a method are described below.

FIG. 1, shows a simulation of EMB vs wavelength 100 for a MMF fiber compliant to the OM4 standard. In this figure, we show the EMB 105 has a peak value at $\lambda_p$ 120. The labels 115 and 125 show the measured and predicted wavelengths, $\lambda_M$ and $\lambda_S$, respectively. The range 110 shows the spectral window in which the fiber can maintain an EMB higher than a specified value, i.e., 4700 MHz·km for OM4.

In principle, based on MMF theory, when all the physical parameters of the fiber are known (i.e., dimensions, refractive profile, dopant types and content), the EMB at $\lambda_S$ can be predicted from the EMB value at $\lambda_M$. In practice however, variations in the refractive index design and dopant content during the preform fabrication process produce changes in 100 which prevent the estimation of the EMB at $\lambda_S$. FIG. 2 shows simulated MMFs with identical EMB at $\lambda_M$ 200, but different EMB spectral dependence. Peaks 205, 210, 205 are different and uncorrelated with 200. Moreover, since the spectral windows 220, 225 and 230 are different, an estimation of the EMB at $\lambda_S$ 240 is not possible.

Shown in FIG. 3. is the EMB at 850 nm and 953 nm for a large number of simulated fibers, represented using rectangle markers 300 with random variations in their refractive index core. The horizontal and vertical axes of this figure represents the EMB at $\lambda_M$=850 nm vs. EMB $\lambda_S$=953 nm, respectively. A subset of these fibers that meet the TIA-492AAAD OM4 EMB specification are represented by diamonds markers 305. This figure shows the lack of correlation among EMBs at 850 nm and 953 nm. For example, in 310, a measured fiber with EMB=6000 MHz·km at 850 nm can have any value from 1500 to 3000 MHz·km at 953 nm. Conversely, 315 shows that a MMF with EMB=2000 MHz·km at 953 nm can have any value from 200 to 15000 MHz·km at 850 nm. This simulation, which was extended for a large range of wavelengths from 800 nm to 1100 nm, clearly shows that there is no direct relationship between the fiber's EMB at a specified wavelength, $\lambda_S$, and the EMB at a measured wavelength, $\lambda_M$, when $\lambda_S \neq \lambda_M$.

A method that enables the prediction of the EMB at an arbitrary wavelength based on measurements at another wavelength is desirable to reduce testing time and cost of an MMF.

BRIEF DESCRIPTION OF THE DRAWINGS

FIG. 8(a) shows DMD pulses at 850 nm and 953 nm for three fibers of population A.

FIG. 10(a) shows centroid features for A and B populations for radial offsets 1-12.

FIG. 13(a) shows measured and estimated DMD pulses at 953 nm for A population.

SUMMARY OF THE INVENTION

Methods for estimating the Effective Modal Bandwidth (EMB) of laser optimized Multimode Fiber (MMF) at a specified wavelength, $\lambda_S$, based on the measured EMB at a first reference measurement wavelength, $\lambda_M$. In these methods the Differential Mode Delay (DMD) of a MMF is measured and the Effective Modal Bandwidth (EMB) is computed at a first measurement wavelength. By extracting signal features such as centroids, peak power, pulse widths, and skews, as described in this disclosure, the EMB can be estimated at a second specified wavelength with different degrees of accuracy. The first method estimates the EMB at the second specified wavelength based on measurements at the reference wavelength. The second method predicts if the EMB at the second specified wavelength is equal or greater than a specified bandwidth limit.

DETAILED DESCRIPTION OF THE INVENTION

The present invention discloses novel methods to estimate the EMB of a MMF at a desired wavelength, from measurements performed at another wavelength. The first method, Method 1, can be used to predict the EMB at an arbitrary wavelength, $\lambda_S$, based on an EMB measurement at a different wavelength, $\lambda_M$. The second method can be used to evaluate if the EMB at an arbitrary wavelength, $\lambda_S$, is equal of greater than a minimum specified threshold. Each method provides different degrees of complexity and accuracy.

Figure 4:
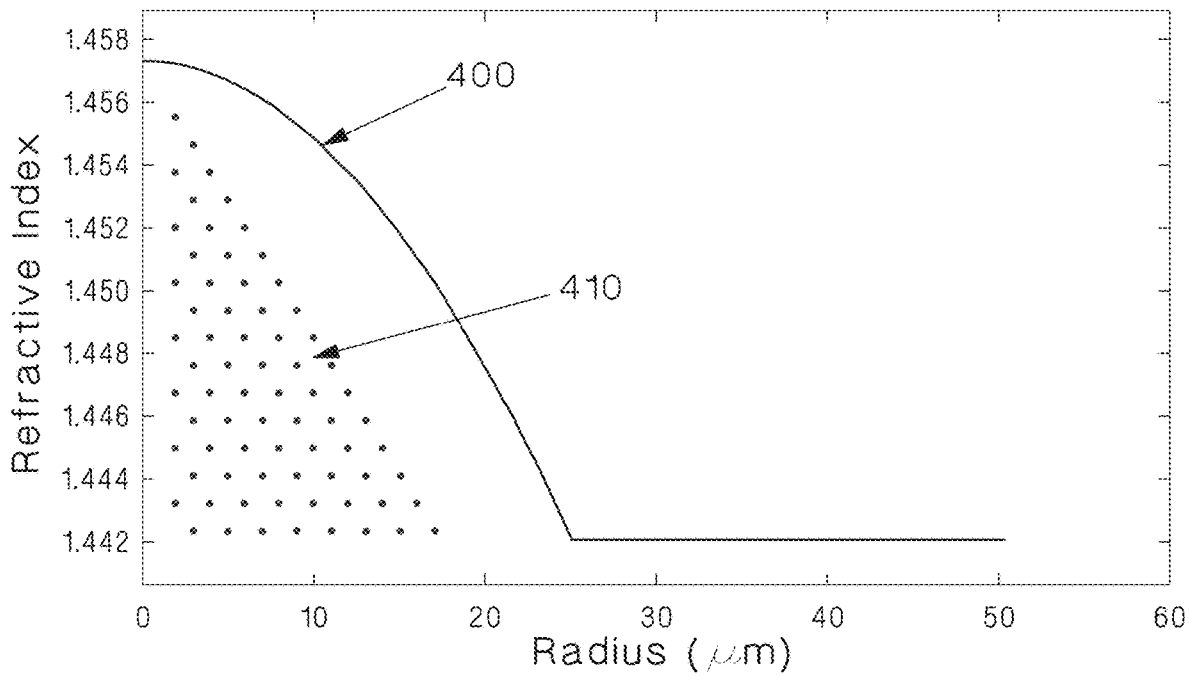
FIG. 4 shows a traditional MMF refractive index profile.
Figure 5:
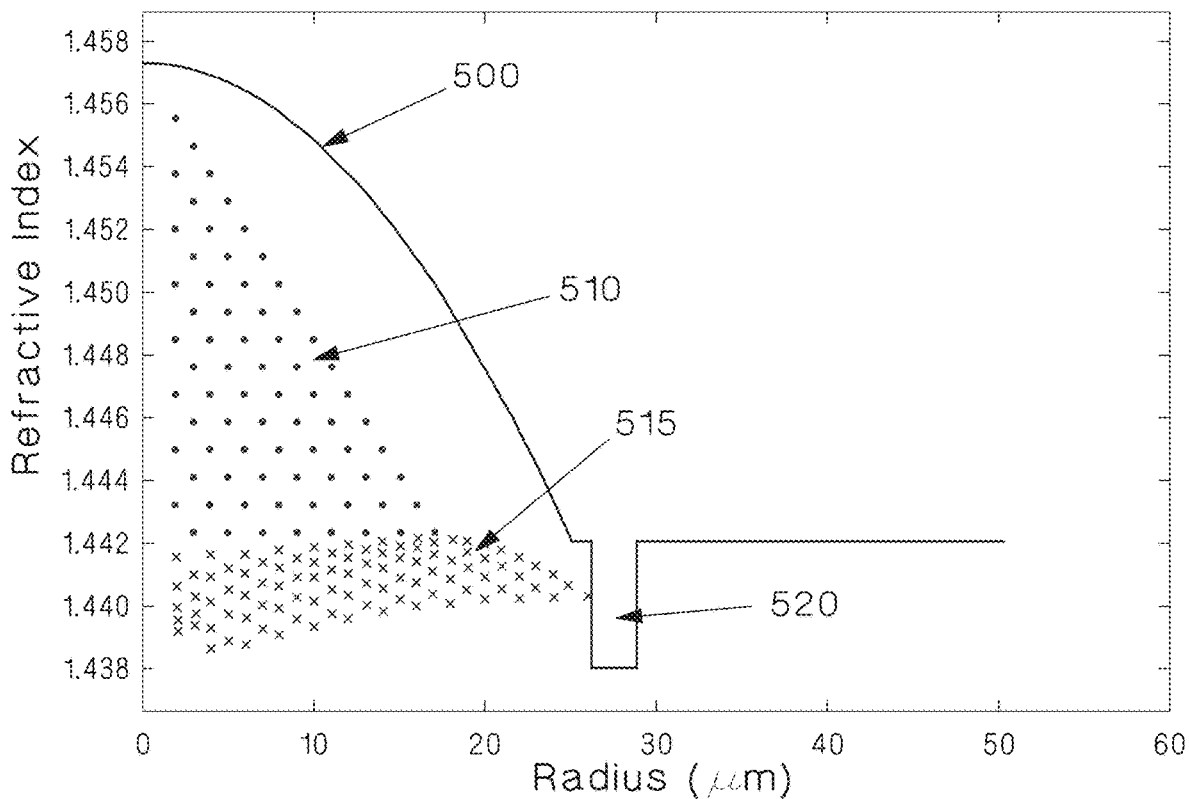
FIG. 5 shows an MMF refractive index profile with a trench in the cladding.

These methods can be used for the design and manufacturing processes of MMF that have a core and a cladding where the index of refraction of the cladding is less than that of the core. The core has a gradient index of refraction which varies from a peak value at the center of the core to a minimum value at the cladding interface following a predominant alpha-profile function to minimize modal dispersion [JLT 2012]. Refractive index profiles for two types of MMF are shown in FIGS. 4 and 5. In FIG. 4 a traditional MMF refractive index profile is shown. The profile 400 does not present any abrupt discontinuity inside the core or inside the cladding. The propagating mode groups of this fiber are shown in 410. In FIG. 5 the refractive index profile 500 abruptly changes in the cladding due to the refractive index trench 520 introduced to provide lower bending loss. Labels 510 and 515 show some of the propagating and leaking mode groups, respectively.

Figure 1:
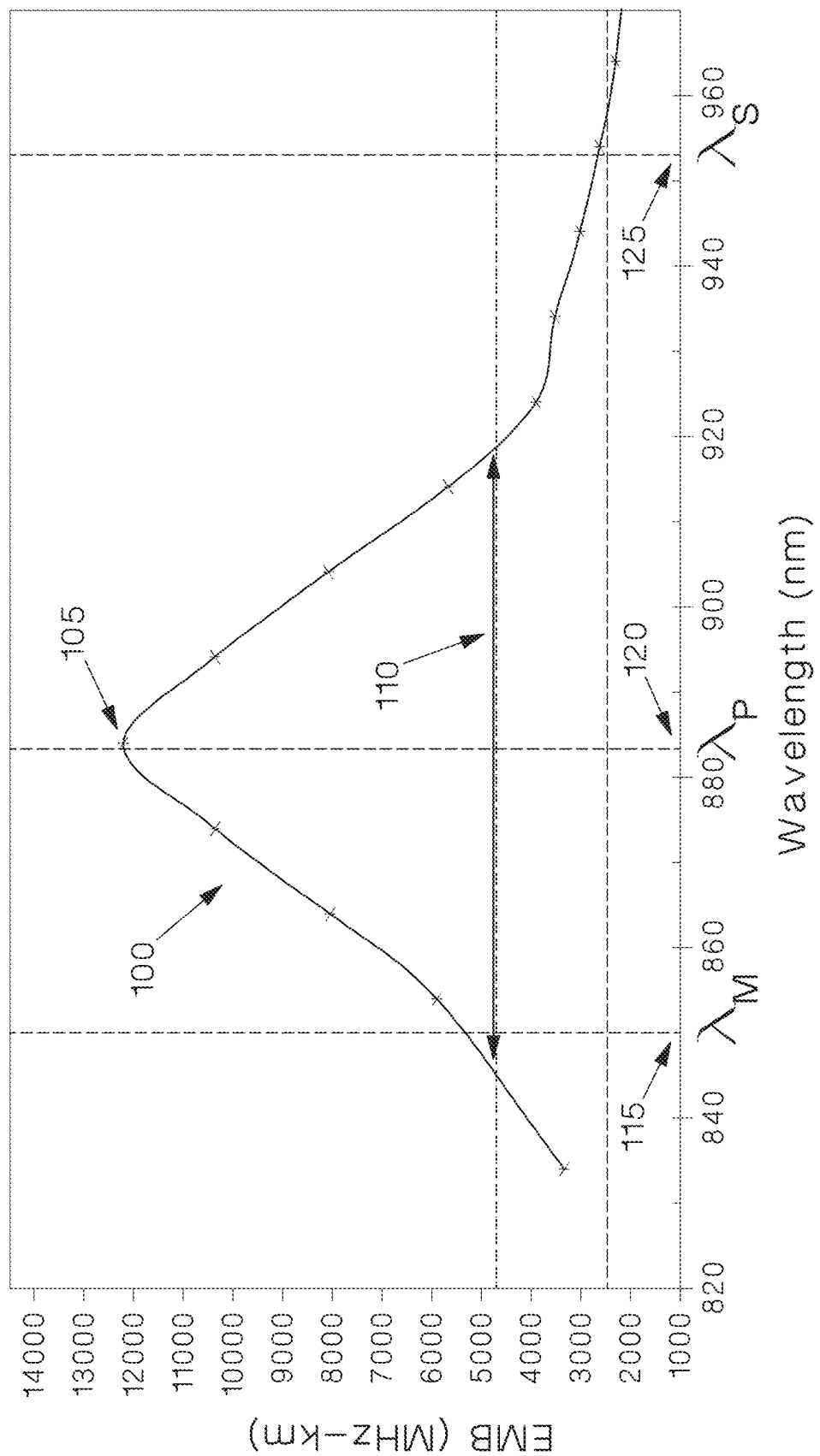
FIG. 1 shows the EMB for an OM4 standard compliant multimode fiber.
Figure 2:
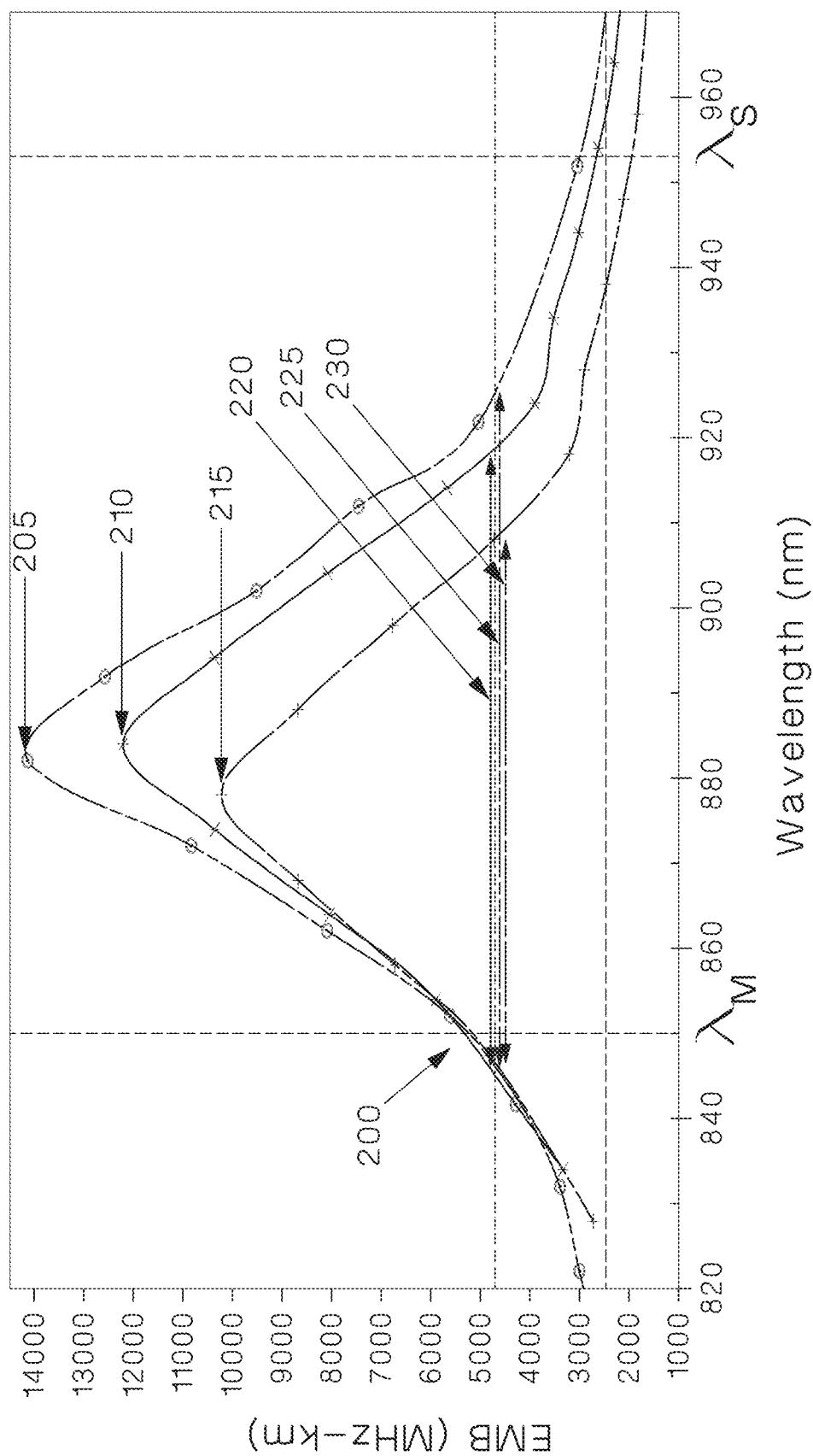
FIG. 2 shows the EMB for several OM4 standard compliant multimode fibers with identical bandwidths at 850 nm.
Figure 3:
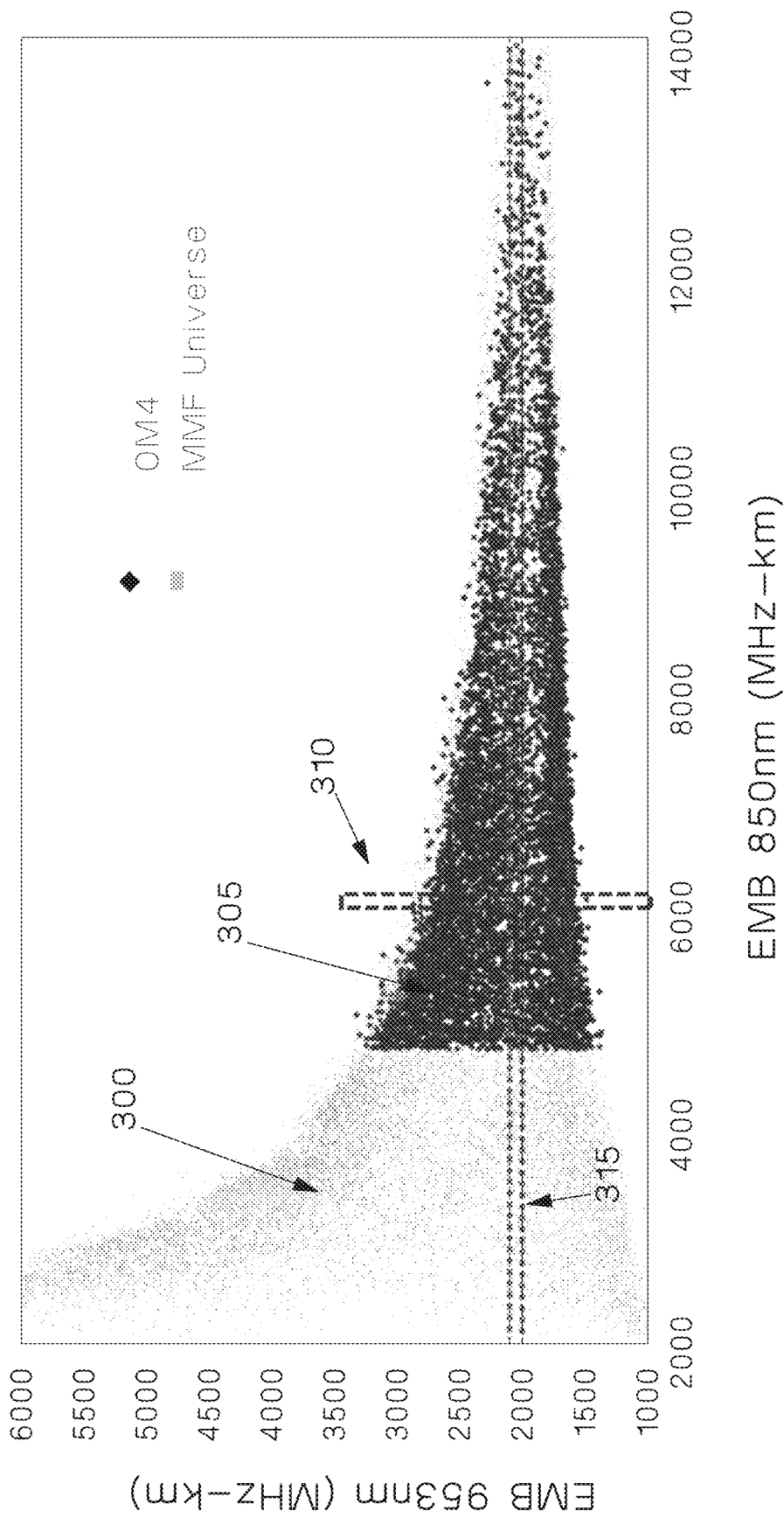
FIG. 3 shows EMB at 953 nm vs. EMB at 850 nm for 1000 multimode fibers.

Waveguide theory for alpha-profile fibers has been well developed [ref]. The theory can enable the modeling of fiber DMD behavior over a broad range of wavelengths, when the profiles and dopants concentrations are known. In practice however, due to manufacturing variations the designed "optimum" refractive index profile is distorted deterministically and randomly. Very small alterations in 400 or 500 basically change the way the mode groups 410, 510 interact with the variations in refractive index, which destroys or reduces the correlations among DMDs at different wavelengths as was shown in FIG. 3.

Method 1

Figure 6:
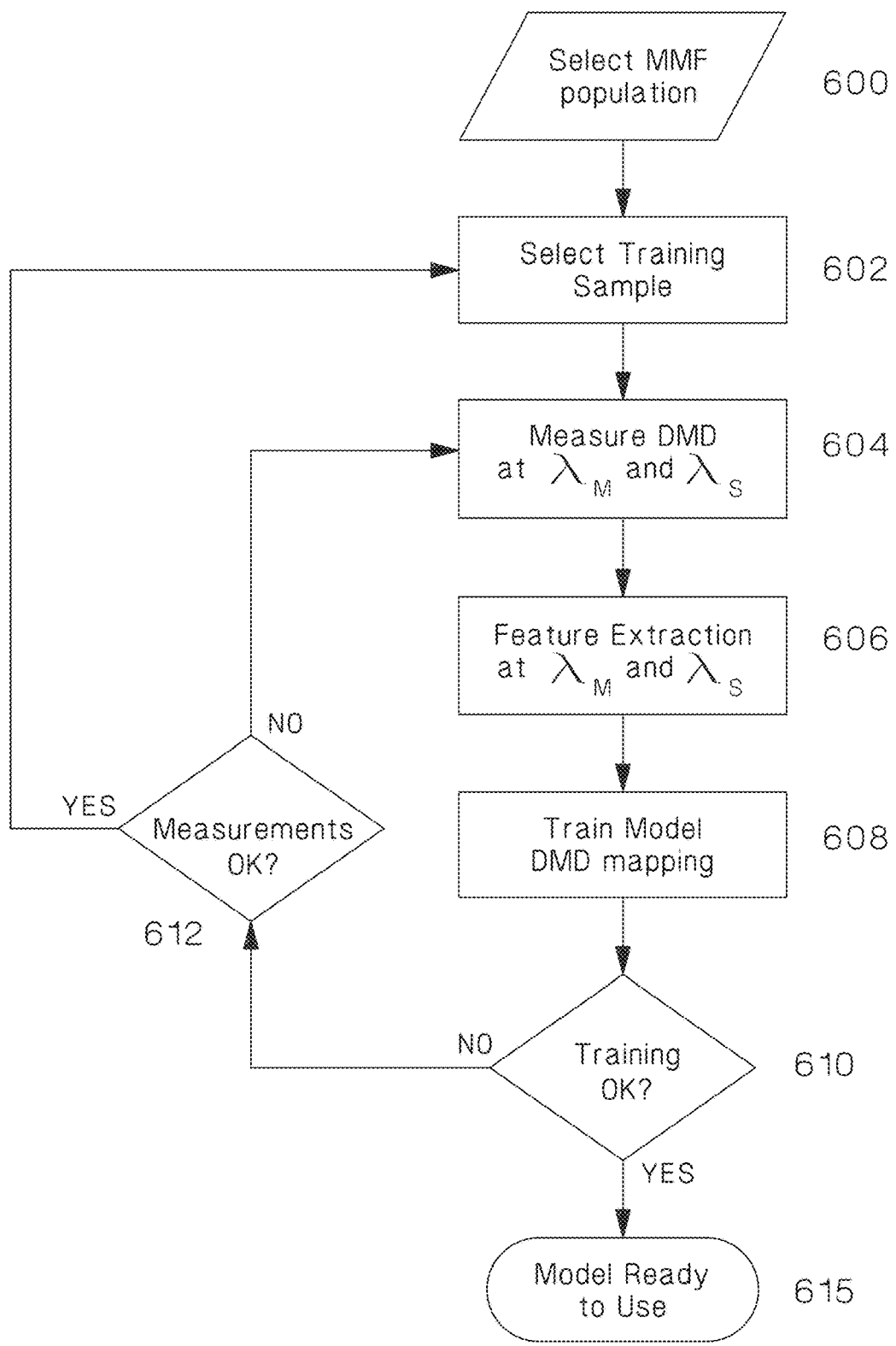
FIG. 6 shows a flow diagram for a training method.
Figure 7:
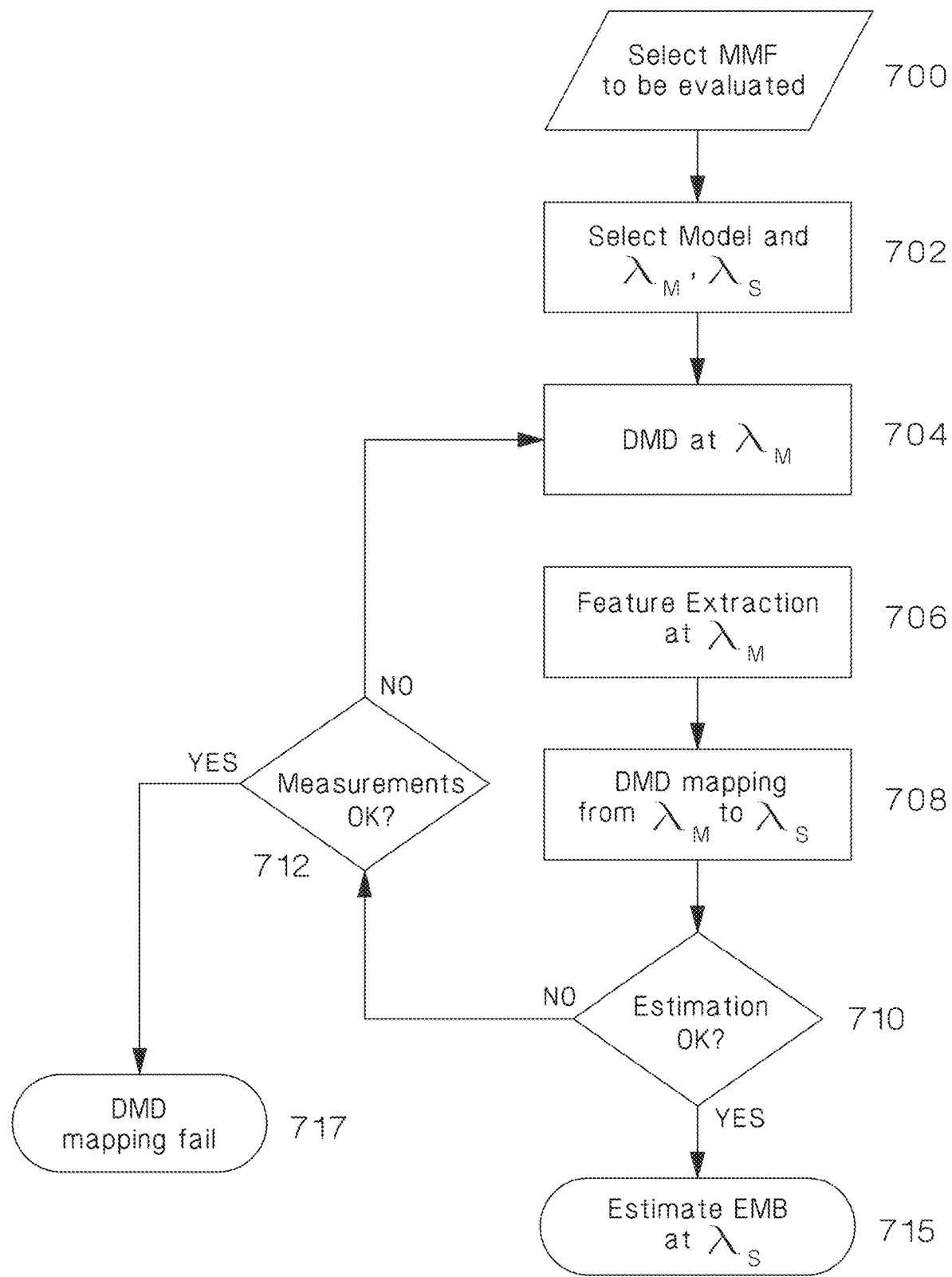
FIG. 7 shows a flow diagram for an estimation method.

This method, can be used to predict the EMB at an arbitrary wavelength, $\lambda_S$, based on an EMB measurement at a different wavelength, $\lambda_M$. The method was developed based on the inventors' realization that in order to increase the correlation among EMB measurements at $\lambda_M$, and a second wavelength, $\lambda_S$, a new approach that fully utilizes the information provided by the measured DMD waveforms is required. The method proposed here uses the DMD pulse waveform information at $\lambda_M$, such as centroids, peak position, width, shapes, energy per radial offset, and skews, to predict the EMB at a second wavelength. Statistical and signal processing techniques disclosed here, allow us to extract and utilize those parameters to distort the DMD pulse waveforms acquired at $\lambda_M$, to predict the DMD pulse waveforms at $\lambda_S$. This method, which requires a training of the algorithm, enables the prediction of EMBs at different wavelengths from one measurement. FIGS. 6 and 7 show the block diagrams for the training and estimation processes, respectively. For illustrative purposes, we use an example to describe both methods.

Training for Method 1

Figure 8B:
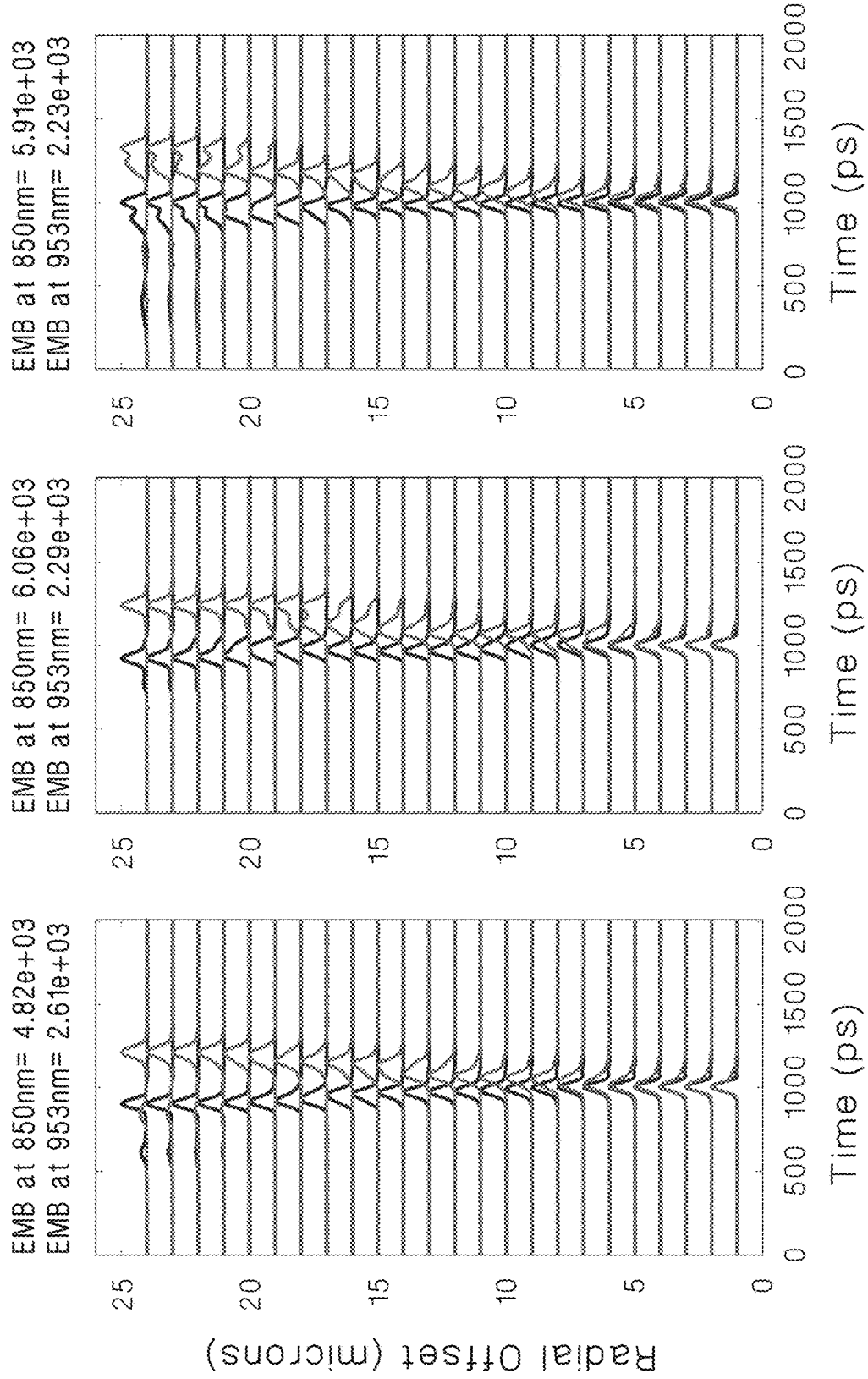
FIG. 8(b) shows DMD pulses at 850 nm and 953 nm for three fibers of population B.

In 600, the populations of TIA-492AAAD standards compliant OM4 fibers from two suppliers (A and B), which use different manufacturing processes are selected. It is understood that the population used here is only an example and is not restricted to any specific number of fiber suppliers. In 602, we select a subset of 24 fibers from manufacturer A and 12 from manufacturer B for training. In 604, the DMD of all fibers are measured at the first measurement wavelength, $\lambda_M$=850 nm, and the second specified wavelength, $\lambda_S$, which in this example is taken to be 953 nm. These measurements are stored in the array y(r,t,$\lambda$) for analysis. FIGS. 8(a) and 8(b) show the DMD radial pulses for three MMF from each population at 850 nm (dark trace) and 953 nm (lighter trace). FIGS. 8(a) and 8(b) show that most of the fibers have similar DMD pulses at low radial offset for both wavelengths. For population A, the DMD pulse shapes are very different at larger radial offset for the two wavelengths.

Figure 9:
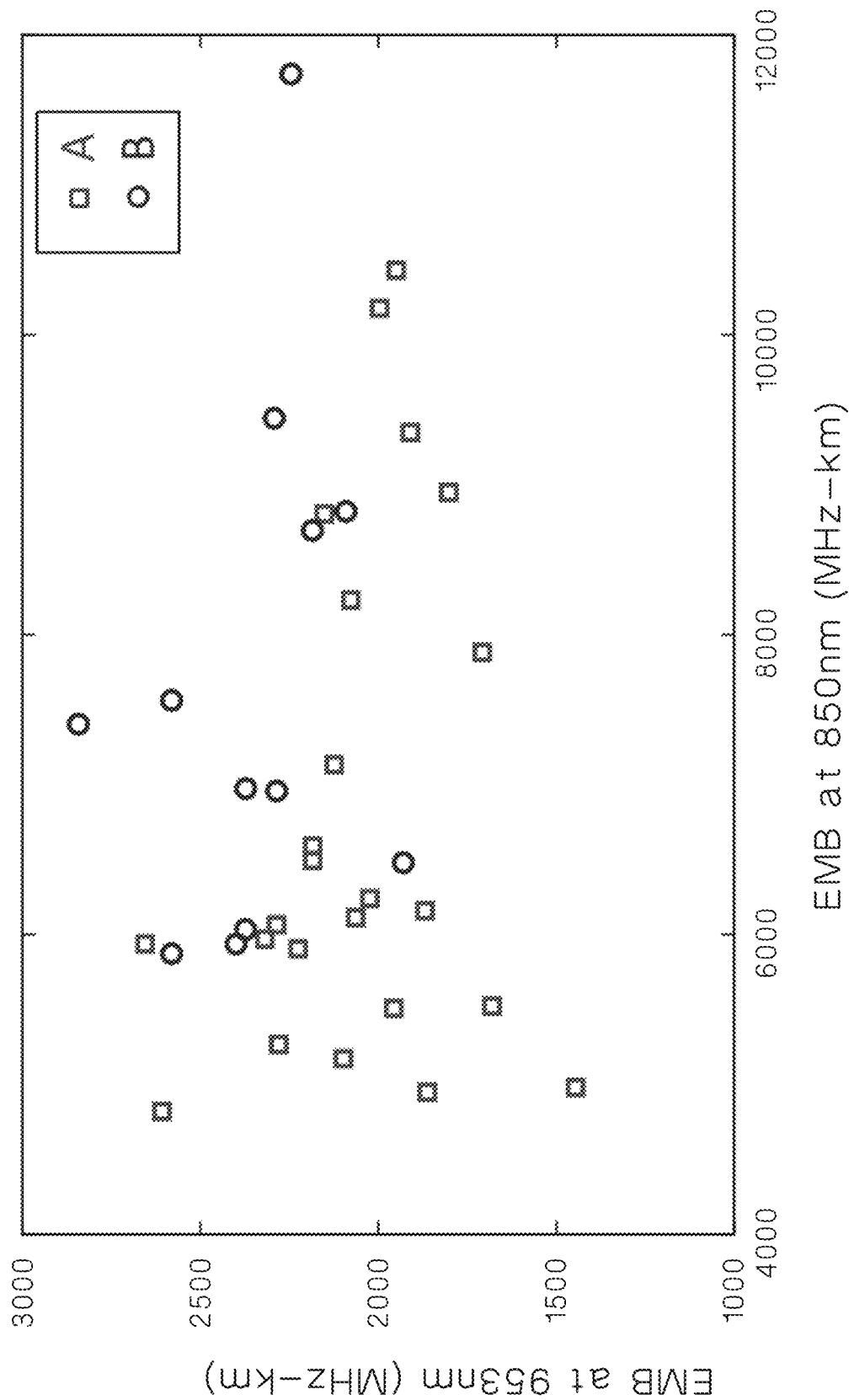
FIG. 9 shows measured EMB at 953 nm vs. 850 nm for A and B population.

The EMBs computed from the measured DMD pulses for the A and B populations at 850 nm and 953 nm are shown in FIG. 9. These measurements agree with simulation results shown in FIG. 3, which indicates that EMBs at different wavelengths are uncorrelated.

In step 606 of FIG. 6, the main features of the DMD pulses at each wavelength are extracted. This process captures the main characteristics required to describe the DMD pulses at each radial offset and each wavelength for post-processing and analysis. As an illustrative example, here we extract the centroid, mean power, peak power value and position, and the root mean square (RMS) width. The centroid feature is computed using, $$C_{r,\lambda} = \frac{\sum_k t_k y(r, t_k, \lambda)}{\sum_k y(r, t_k, \lambda)} \quad (1)$$

where r is the radial offset index that relates the position of the single-mode launch fiber to the MMF core center axis during the DMD measurement, t is the discrete length normalized temporal, k is the time index. The variable t and k are related to the number of temporal samples simulated or acquired from the oscilloscope during DMD measurements at a given wavelength. The mean power is computed by, $$Y\text{mean}_{r,\lambda} = \frac{\sum_k y(r, t_k, \lambda)}{\sum_k t_k} \quad (2)$$

The peak power is computed using, $$Y\text{peak}_{r,\lambda} = \max_t(y(r;t_k,\lambda)) \quad (3)$$

where $\max_t(.)$ is a function that finds the maximum of the DMD pulses for each radial offset and for each wavelength. The peak position is computed using, $$P_{r,\lambda} = \text{find\_peak}(y(r;t,\lambda)) \quad (4)$$

where, find_peak is a function that finds the maximum value of the DMD pulses for each radial offset and for each wavelength. The RMS width of the pulse for each radial offset is computed, $$W_{r,\lambda} = \sqrt{\frac{\sum_k (t_k - C_{r,\lambda})^2 y(r, t, \lambda)}{\sum_k y(r, t_k, \lambda)} - (T_{REF})^2} \quad (5)$$

where $T_{REF}$ is the RMS width of the reference pulse used for the measurement.

The features extracted from DMD measurements at $\lambda_M$, are used to predict features at $\lambda_S$, based on the model described in equations (6-8).

$$C_{r,\lambda_S} = (1+I_C(r))C_{r,\lambda_M} + F_C(\lambda_M,\lambda_S)G_C(r) \quad (6)$$

where $C_{r,\lambda_S}$, and $C_{r,\lambda_M}$ represent the centroids per radial offset at $\lambda_M$ and $\lambda_S$, $I_C(.,.)$, $F_C(.,.)$, $G_C(.)$ is the set of polynomial functions that describe the relationship between centroids at those wavelengths.

$$P_{r,\lambda_S} = (1+I_P(r))P_{r,\lambda_M} + F_P(\lambda_M,\lambda_S)G_P(r) \quad (7)$$

where $P_{r,\lambda_S}$, and $P_{r,\lambda_M}$ represent the centroids per radial offset at $\lambda_M$ and $\lambda_S$, $I_P(.,.)$, $F_P(.,.)$, $G_P(.)$ is the set of polynomial functions that describe the relationship between peak positions at those wavelengths.

$$W_{r,\lambda_S} = (1+I_W(r))W_{r,\lambda_M} + F_W(\lambda_M,\lambda_S)G_W(r) \quad (8)$$

where $W_{r,\lambda_S}$, and $W_{r,\lambda_M}$ represent the centroids per radial offset at $\lambda_M$ and $\lambda_S$, $I_W(.,.)$, $F_W(.,.)$, $G_W(.)$ is the set of polynomial functions that describe the relationship between widths at those wavelengths.

The F(.,.) functions are solely dependent on the measured and targeted wavelength. These functions accommodate for chromatic effects in the refractive index and material. The G(.) functions are solely dependent on radial offsets and accommodate for relationships between the group velocity of DMD pulses at different radial offset in the fiber core. The I(.) functions, dependent on the radial offset, accommodate for mode transition due to the change of wavelengths.

Figure 10B:
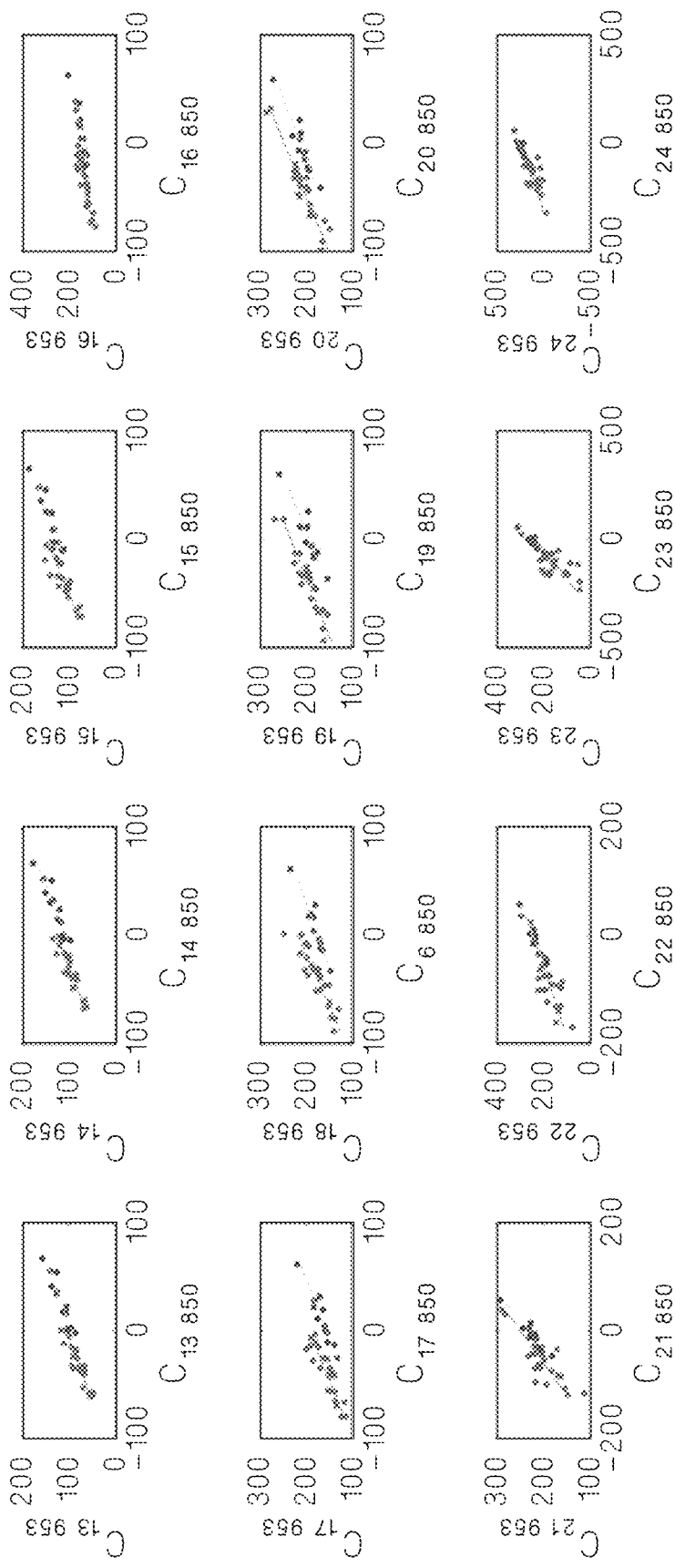
FIG. 10(b) shows centroid features for A and B populations for radial offsets 13-24.
Figure 11A:
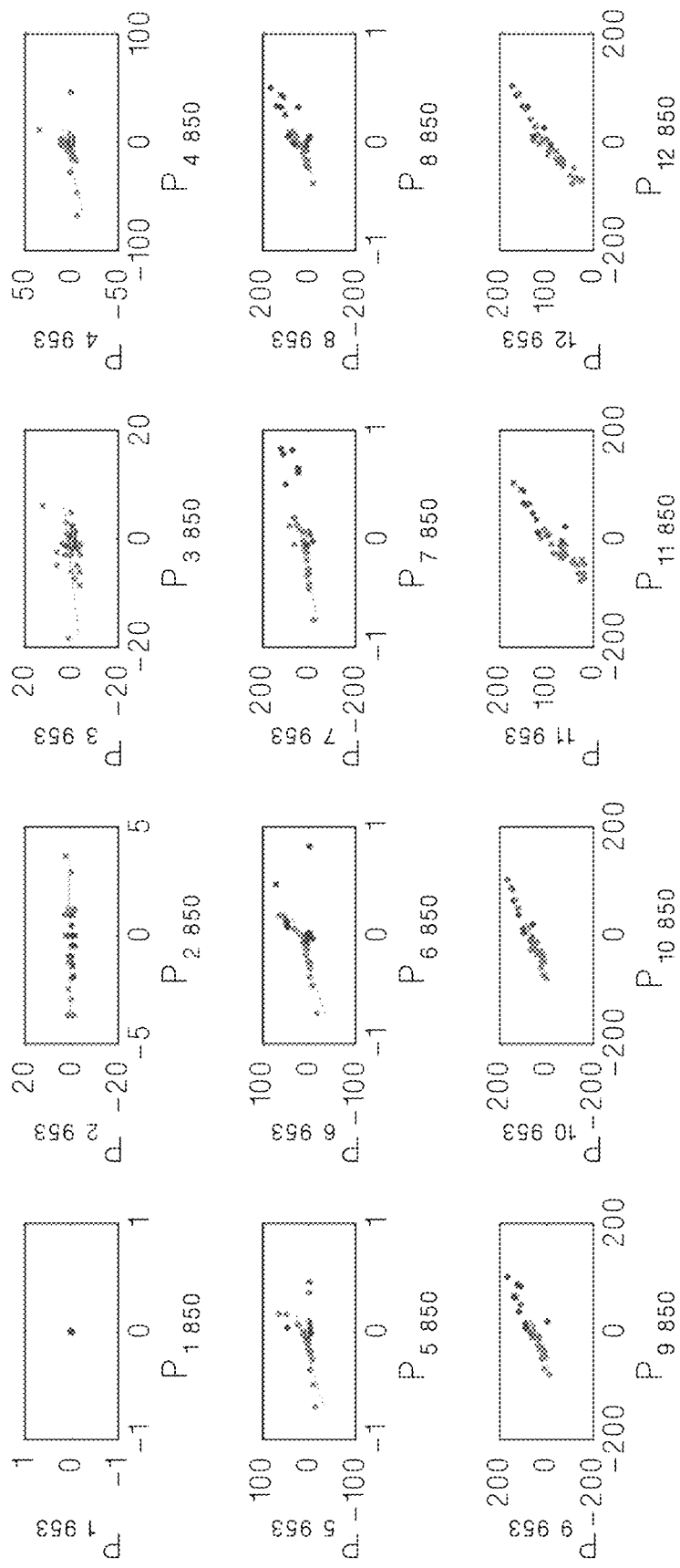
FIG. 11(a) shows peak position features for A and B populations for radial offsets 1-12.
Figure 11B:
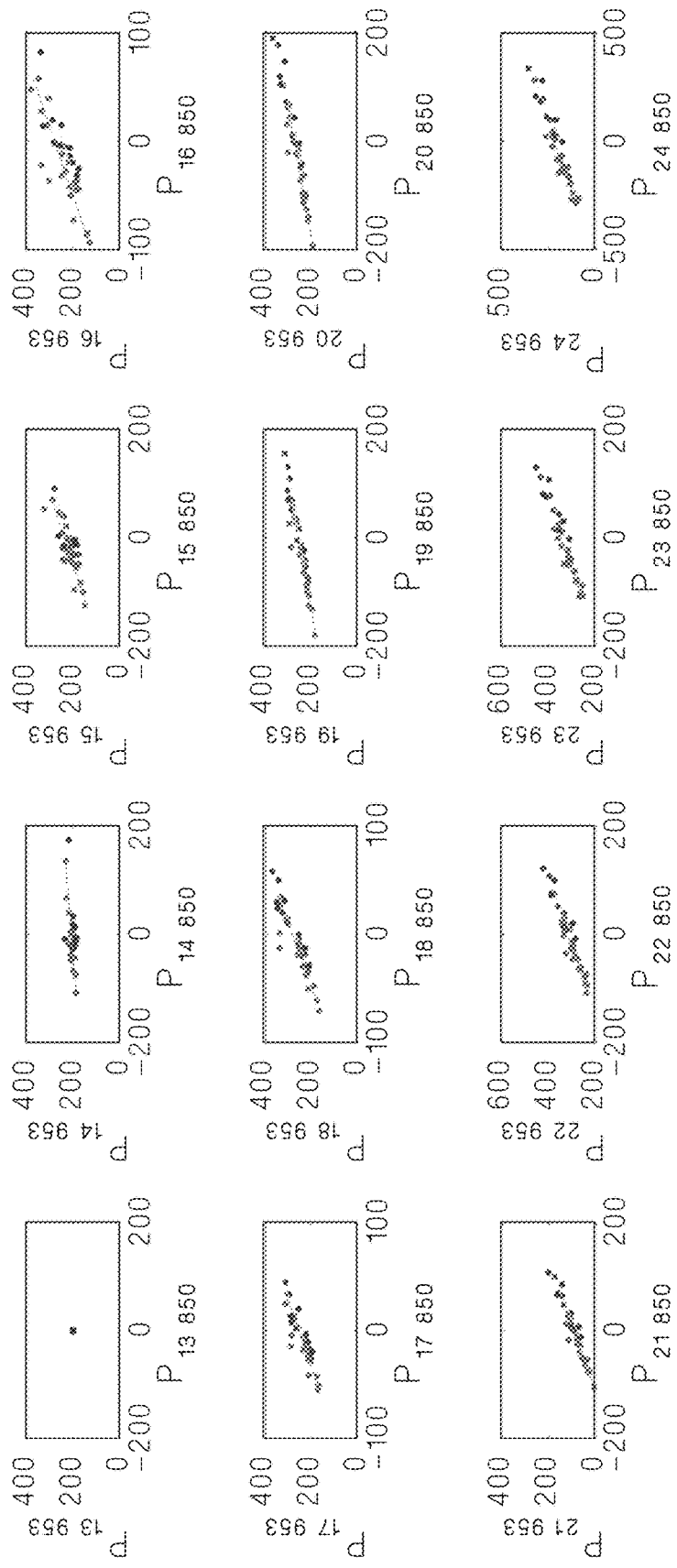
FIG. 11(b) shows peak position features for A and B populations for radial offsets 12-24.
Figure 12:
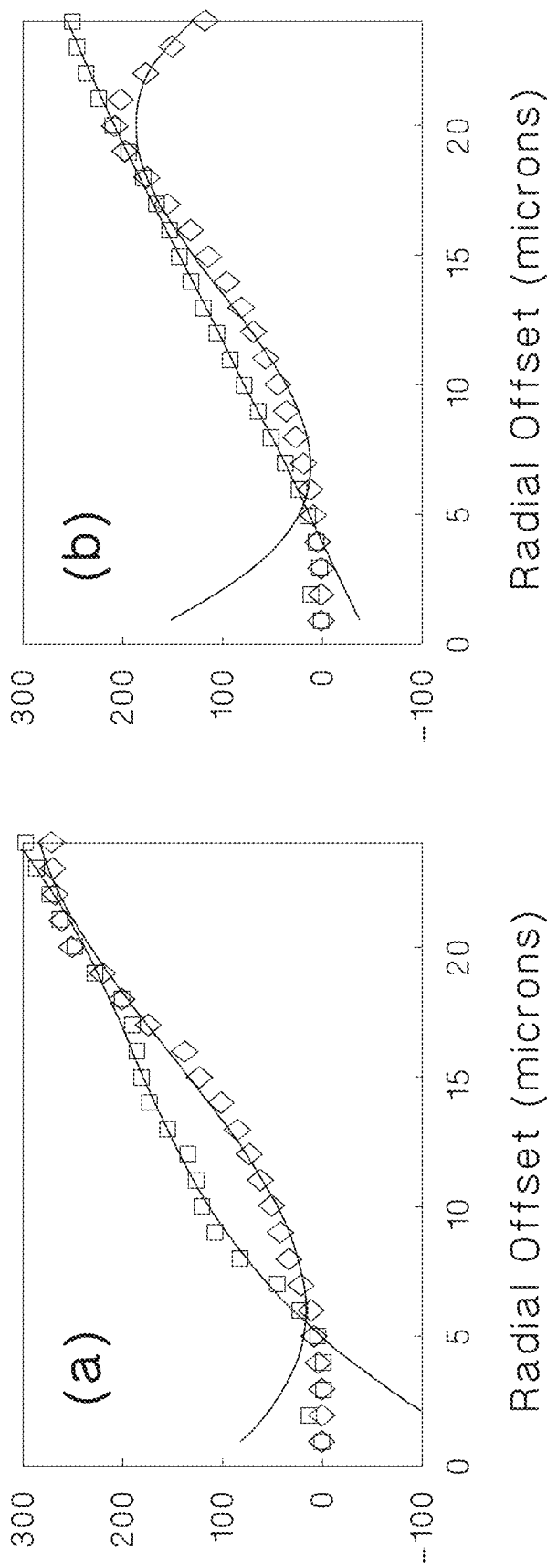
FIG. 12 shows $G_C$ and $G_P$ functions as a function of radial offset for A and B populations.

In step 608, the features extracted from the measured DMD pulses at the two wavelengths are used to find the coefficients of the polynomial functions described above (6-8). Standard curve fitting techniques are applied as described in [3]. For the samples used in this example, FIGS. 10 (a) and (b), show the centroid features for 850 nm and 953 nm for radial offsets from 1 to 24 microns for the two fiber populations A (red) and B (blue). FIGS. 11(a) and (b), show the peak positions for 850 nm and 953 nm for radial offsets from 1 to 24 microns for the two fiber populations. For these samples, F(850,953) was 16 ps/μm/km for population A and 13.3 ps/μm/km for population B. The functions $G_C(.,.)$ and $G_P(.,.)$ for a cubic polynomial curve fitting is shown in FIGS. 12 (a) and 12 (b) for fiber populations A and B, respectively. Similarly, curves for the other features described above (1-5) are obtained.

In 610 the correlations among the features, i.e., the ones shown in FIGS. 1-12 are evaluated. If they are higher than a determined threshold, e.g., 80%, the model is ready to use and the process end in 615. If not, in 612 the signal to noise ratio (SNR) of all DMD measurements are evaluated. If the noise of the measurements is higher than a pre-determined threshold, the measurements need to be repeated. If the SNR is high, but the correlations are low, it is possible that the samples do not represent the fiber population and a new set of samples will be required.

Method 2: Estimation Method

After training, the method for the DMD mapping and estimation, shown in FIG. 7, is ready to use. Here, we use the same example to describe the processes. In 700 the fibers that require EMB estimation are selected. In 702, the model described in (6-8) and the wavelengths (in this case $\mu_M$=850 nm, $\lambda_S$,=953 nm) are selected. In 704, the DMD at $\lambda_M$ is measured. In 706 the features are extracted from the DMD pulse centroids at $\lambda_M$ using equations (1-5). In 708 the DMD pulses are estimated at $\lambda_S$. Next, the model described in equations (6-8) is used to estimate the features $C_{r,\lambda_S}$, $P_{r,\lambda_S}$, $W_{r,\lambda_S}$, Y max$_{r,\lambda_S}$, Ymean$_{r,\lambda_S}$ at $\lambda_S$.

The parameter $P_{r,\lambda_S}$ is used to reposition each of the DMD pulses using, $$y_P(r;t_k,\lambda_S) = y(r;t_k - (P_{r,\lambda_S} - P_{r,\lambda_M}),\lambda_M) \quad (9)$$

where the $y_P(.,.,.)$ array represents the estimated DMD pulses after the peak position correction.

The differences between the centroid and peak position are computed at both wavelengths. The variation of these differences are computed as shown, $$\Delta = (C_{r,\lambda_S} - P_{r,\lambda_S}) - (C_{r,\lambda_M} - P_{r,\lambda_M}) \quad (10)$$

The parameter Δ is used to estimate the new width and skew of the DMD pulses at $\lambda_S$. In the majority of cases, when, $\lambda_S > \lambda_M$, the DMD pulse width tends to increase. Conversely, when $\lambda_S < \lambda_M$, the width tends to decrease. The changes in skew and width are corrected using a linear filter as shown $$y_W(r, t_k, \lambda_S) = \sum_{i=0}^{N_{taps}} A_i y_p(r, t_k - Ki\Delta, \lambda_S) \quad (11)$$

where $y_W(.,.,.)$ represents the estimated DMD after equalization, i is the equalizer tap index, Ntaps the number of taps, $A_i$ represents the tap coefficient, K is a scaling factor.

For each fiber, the optimum values of Ntaps, $A_i$, and K, are found by numerically searching. The constraint conditions or equations for this search are the estimated mean, peak, and the values shown in table I.

TABLE I $$\frac{\sum_k y_W(r, t_k, \lambda_S)}{\sum_k t_k} \leq Ymean_{r,\lambda_S}$$

$$\max_t(y_W(r, t_k, \lambda_S)) \leq Ymean_{r,\lambda_S}$$

$$\sqrt{\frac{\sum_k (t_k - C_{r,\lambda})^2 y_W(r, t, \lambda_S)}{\sum_k y_W(r, t_k, \lambda_S)}} \leq W_{r,\lambda_S}$$

In 710, the algorithm evaluates if the conditions shown above can be maintained below a pre-determined threshold, e.g., 60% of the estimated constraint' values. If that is not achieved, in 712 the SNR of the DMD measurement is evaluated. Depending on this, the DMD may need to be measured again 704. Otherwise, in 717 it is indicated that the estimation failed. If the conditions compared in 710 are achieved, the algorithm provides the DMD corrected pulses and the estimated EMB is obtained.

Figure 13B:
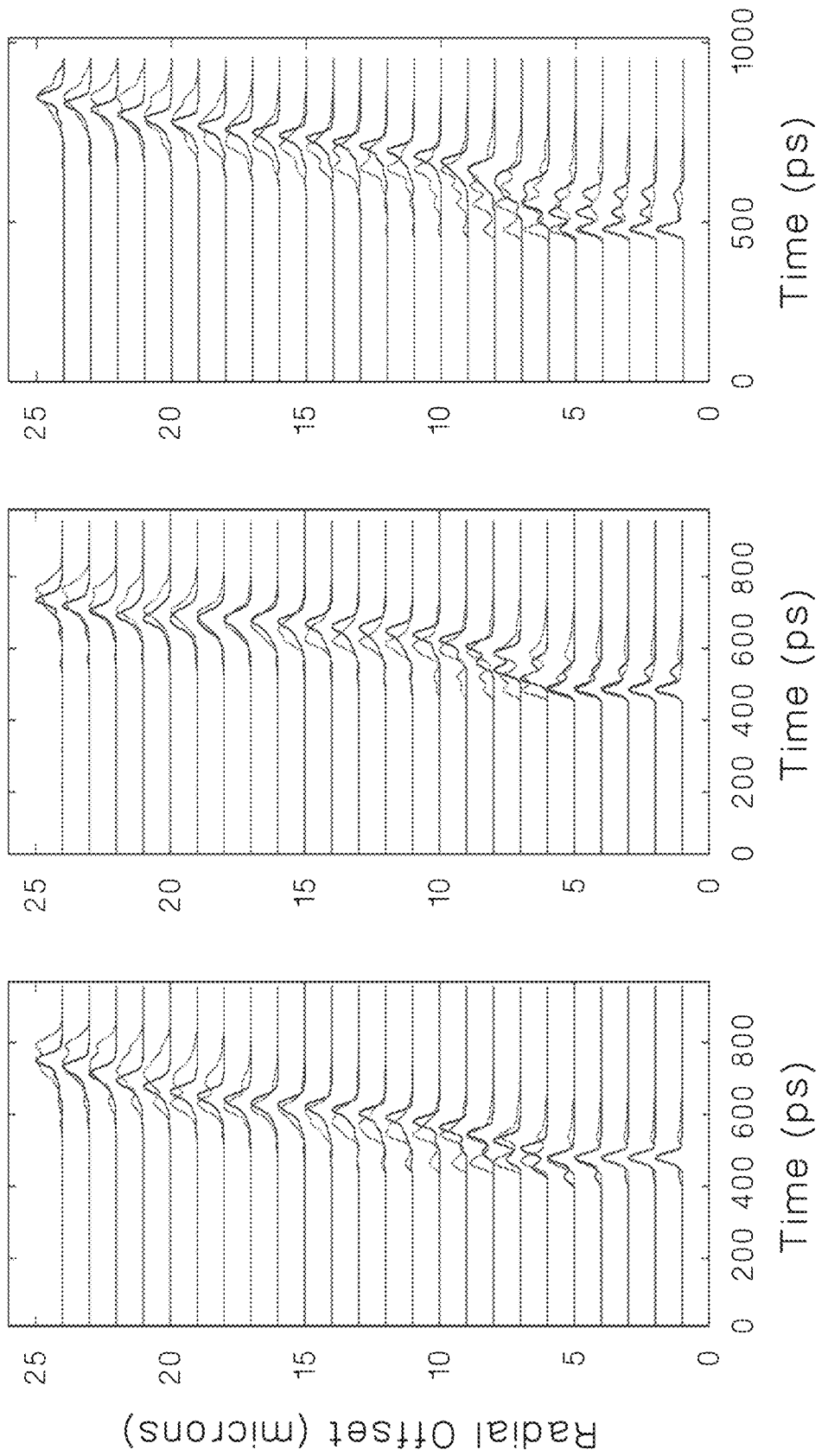
FIG. 13(b) shows measured and estimated DMD pulses at 953 nm for B population.
Figure 14:
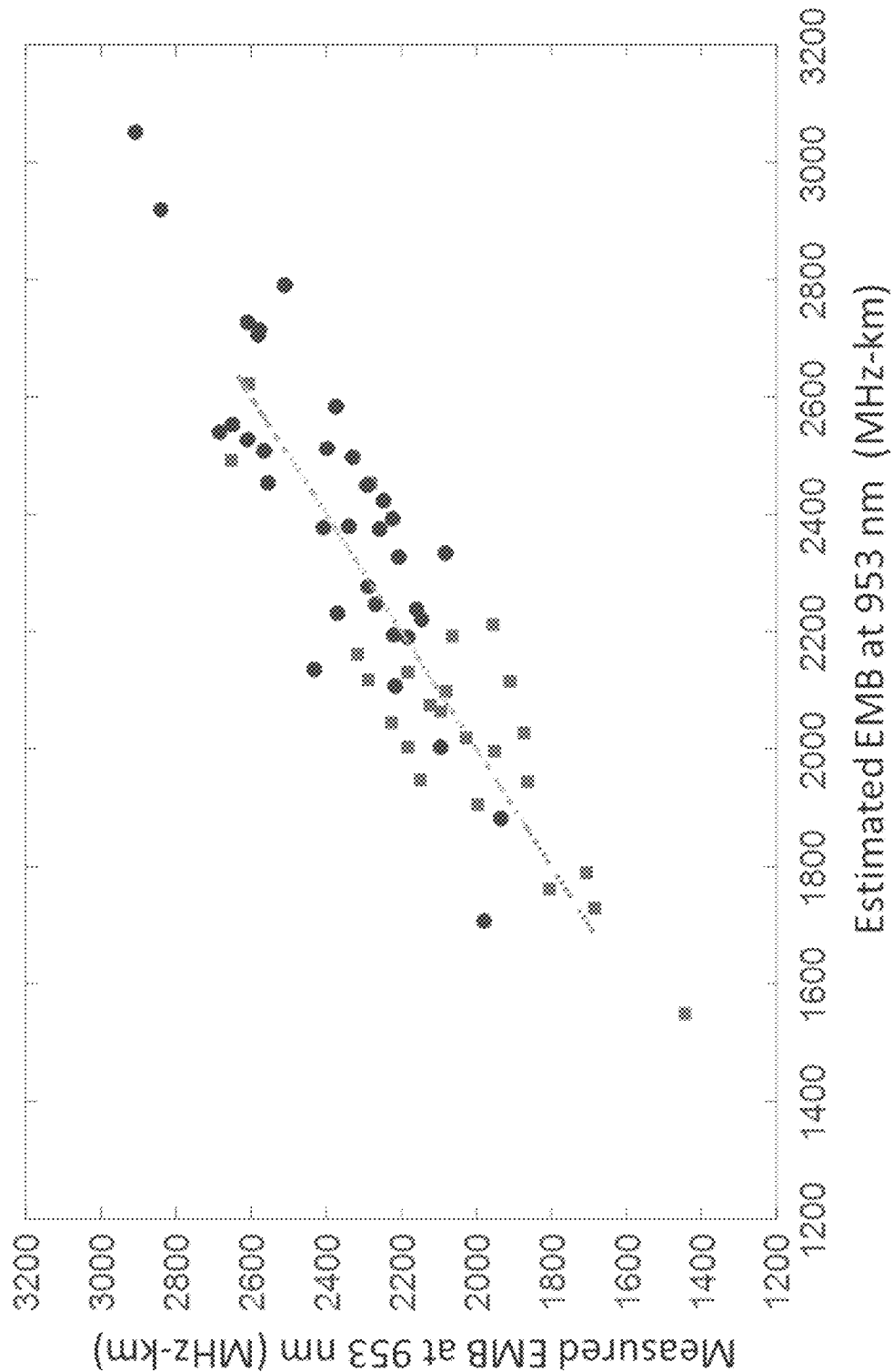
FIG. 14 shows estimated EMB vs. measured EMB after training.

FIG. 13, shows the corrected DMD results for populations A and B. In FIG. 14 the estimated and measured bandwidths at $\lambda_S$=953 nm are shown. The correlation for these results is around 80%-90%.

Method 2

This method can be used to predict if the EMB at an arbitrary second wavelength, $\lambda_S$, is equal or greater than a specified threshold, $EMB_{th}$, based on a DMD measurement at a different wavelength, $\lambda_M$. As in the previous case this method utilizes features of the DMD pulse waveforms at $\lambda_M$, such as centroids, peak position, width, shapes, energy per radial offset, and skews. The average centroid for positions $Rt_{\_start}$-$Rt_{\_end}$ is defined using, $$C_{Top}(R_{T\_start}, R_{T\_end}) = \frac{\sum_{r=R_{T\_end}}^{R_{T\_start}} C_{r,\lambda_M}}{R_{T\_end} - R_{T\_start} + 1} \quad (12)$$

The average centroid for positions $RB_{\_start}$-$RB_{\_end}$ is defined using, $$C_{Bottom}(R_{B\_start}, R_{B\_end}) = \frac{\sum_{r=R_{B\_end}}^{R_{B\_start}} C_{r,\lambda_M}}{R_{B\_end} - R_{B\_start} + 1} \quad (13)$$

A function denominated, P-Shift is computed as $$P\text{-Shift}(R_{T\_start}, R_{T\_end}, R_{B\_start}, R_{B\_end}) = C_{Top}(R_{T\_start}, R_{T\_end}) - C_{Bottom}(R_{B\_start}, R_{B\_end}) \quad (14)$$

The slopes using the peak pulse position for two or more radial regions are computed as shown in equation below.

$$P - \text{Slope}\_R_k = \frac{1}{L} \frac{\sum_{r=R\_start_k}^{R\_end_k} (P_{r,\lambda_m} - T_k)(r - (R\_end_k + R\_start_k)/2)}{\sum_{r=R\_start_k}^{R\_end_k} (r - (R\_end_k + R\_start_k)/2)^2} \quad (15)$$

where k is the index that represent the selected radial offset regions and $$T_k = \frac{1}{R\_end_k - R\_start_k + 1} \sum_{r=R\_start_k}^{R\_end_k} P_{r,\lambda_m} \quad (16)$$

The widths for the same k regions that are computed using:

$$M\text{-Width}_k = 1/L[\max_{r=R\_start_k:R\_end_k}(W(r))] \quad (17)$$

It should be noted for features described in (15-17), the k index can take values from 1 to $N_k$ where $N_k$<25 r of radial offsets, i.e. 25. In practice, as shown in the algorithm training example described below, low values for Nk, i.e., $N_k$=2, are enough to provide estimations with low uncertainty.

The training method, which is described below, utilizes machine learning techniques to find the radial-offset regions that maximize the difference between parameters such as P_shift, P_slopes and M_widths for two or more population of fibers. One population of fiber will have EMB>$EMB_{th}$ at $\lambda_S$ and other populations will not satisfy this constraint. After training the estimation method simply evaluates if the extracted features from MMF under test belong to the regions found during training that satisfy the condition, EMB>$EMB_{th}$ at $\lambda_S$ based on the DMD measurements at $\lambda_M$.

Training for Method 2

The training process is identical to the one shown in FIG. 6, with the exception of steps 606 and 608. We use the same example, starting from 606 of FIG. 6, to illustrate the training method.

In step 606, the main features of the DMD pulses at $\lambda_M$, are extracted. Note the differences with the first method which require the computation of the features at each wavelength, $\lambda_M$ and $\lambda_S$. The extracted features are $C_{r,\lambda_M}$, $P_{r,\lambda_M}$ and $W_{r,\lambda_M}$ (centroid, peak and width) using equations (1-5).

In 608, the training is performed. The training is an iterative process that has the goal to maximize a metric or a series of metrics that represents the differences in features of two groups of fibers. One group, Group 1 are composed by the MMFs that have EMB>$EMB_{th}$ at $\lambda_S$ and the other group, Group 2 by MMFs that have EMB<$EMB_{th}$ at $\lambda_S$.

Initially, all the MMFs used for training are mapped in a space defined by the P_shift, P_slopes and M_widths. The initial values of the regions utilized in (12-17) which are $\{R_{B\_start}, R_{B\_end}\}$, $\{R_{T\_start}, R_{T\_end}\}$, $\{R\_start_k, R\_end_k\}$ are set to random values.

In this example, the utilized metric is a function implemented in C, Python, or Matlab, which computes p-norm distances in the mentioned space, among the MMFs that belong to the groups Group 1 and Group 2.

$$M(R_{T\_start}, R_{T\_end}, R_{B\_start}, R_{B\_end}, R\_start_1, R\_end_1, \ldots, \quad (18)$$

$$R\_start_{N_k}, R\_end_{N_k}) = \Big\{ (P\_Shift\_Group1 - P\_Shift\_Group2)^p +$$

$$\sum_{k=1}^{N_k} A_{1,k}(P\_Slopes\_Group1_k - P\_Slopes\_Group2_k)^p +$$

$$\sum_{k=1}^{N_k} A_{2,k}(M\_Width\_Group1_k - M\_Width1\_Group2_k)^p \Big\}^{1/p},$$

where $A_{1,k}$, $A_{2,k}$ are weight parameters to quantify the relative importance of each feature and/or radial offset regions.

In each iteration the coordinate axes are modified by changing the values of $\{R_{B\_start}, R_{B\_end}\}$, $\{R_{T\_start}, R_{T\_end}\}$, and the set of k parameters $\{R\_start_k, R\_end_k\}$. In addition, the norm parameter p and the weights can also be optimized in each iteration.

During the optimization process, the values can be changed at random, or in deterministic ways. For example, using the random search algorithms or using gradient methods. The features are recomputed using (12-17) for each new set of regions. The MMFs are mapped in the new space and the utilized metric, i.e., equation (18) is computed. The process continues until the metric is maximized, or until an exhaustive search is produced.

To illustrate how the algorithm improves the metric in each iteration we use a set of 35 MMFs. For sake of simplicity, we utilize $N_k=2$, $A_{1,1}=A_{1,2}=1$, and p=1 and the following simplified version of the metric, (18)

$$M\Big(R_{T\_start}, R_{T\_end}, R_{B\_start}, R_{B\_end}, \quad (19)$$

$$R\_start_1, R\_end_1, R\_start_2, R\_end_2 =$$

$$\Big\{ (P\_shift\_Group1 - P\_Shift\_Group2)^p +$$

$$\sum_{k=1}^{2} A_{1,k}(P\_Slopes\_Group1_k - P\_Slopes\_Group2_k) \Big\}$$

Figure 15:
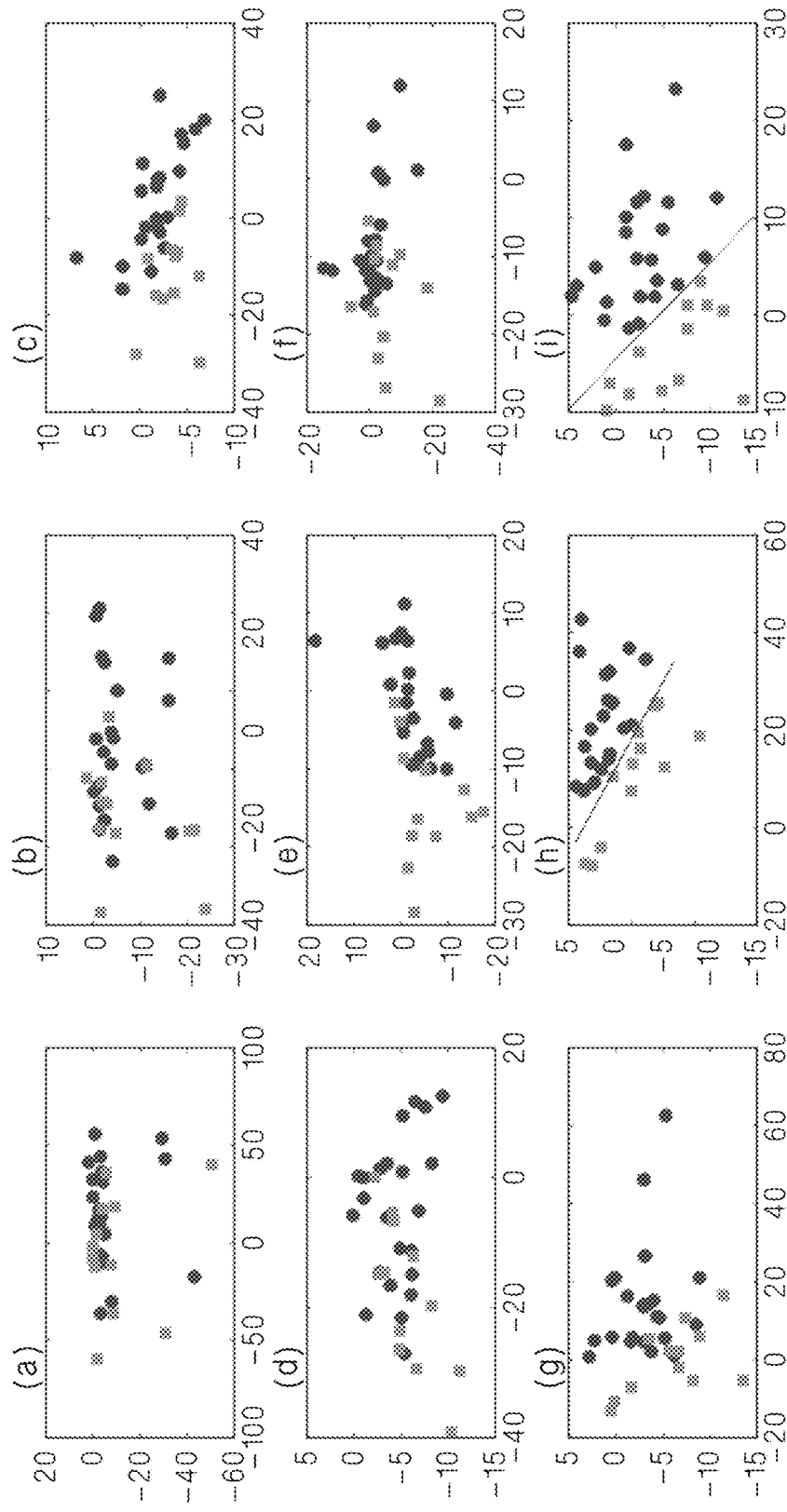
FIG. 15 shows the results for the classification of fibers.

FIG. 15 shows initial mapping of the population for one to 8000 iterations. In the figure, the square markers represent MN/IF from Group 1 and the circle markers represent MMFs from Group 2. It can be observed that for the initial iterations 1-5000, FIG. 15 (a), (b), (c), (d) and (e), it is not possible to differentiate between both populations. After 7000 iterations the algorithm is capable of separate MMF from Group 1 and Group 2. The boundaries between the groups, Group 1 and Group 2, in the plane shown in FIG. 15 (i) can be established (see black trace). Based on this classification the optimum radial offset that optimizes the feature extraction from the DMD pulse waveforms was found. The values of the found regions are: 2 to 10 micron radial offsets for the first P-Slope (k=1), 12 to 23 microns for the second P-Slope (k=2). For the P-shift calculation shown in (14), the optimum regions were 2 to 3 microns for C_Top and 18-24 microns for the C_Bottom The training using the disclosed algorithm demonstrates that the MMFs for Group 1 and Group 2 have distinctive features that can be observed when the optimum set of radial regions to represent them are selected. These results demonstrate a method to predict if $EMB > EMB_{th}$ at $\lambda_S$ based on the DMD measurements at $\lambda_M$.

Estimation Method

During training the optimum radial-offset regions to extract the features that optimally represent MMFs that have $EMB_S > EMB_{th}$ at $\lambda_S$ were found. In the feature-space, see for example FIG. 15(i), the Groups of MMFs that have the desired characteristics can be separated by a line or in general by a polynomial that isolates two regions, one for Group 1 and another for Group 2. For the estimation process the features of a MMF are extracted from DMD measurements at $\lambda_M$ and mapped in the feature-space. If the MMF belongs to the desired regions that produce $EMB > EMB_{th}$ at $\lambda_S$ (see FIG. 17) the fiber is accepted. Otherwise, the fiber is rejected.

Note that while this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive and should instead be understood as potentially combinable if such combinations are permissive. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

Also note that nothing in this disclosure should be considered as limiting and all instances of the invention described herein should be considered exemplary.

The invention claimed is:

1. A method for selecting fibers by estimating the modal bandwidth of a multimode fiber at a second wavelength ($\lambda_S$), based on a DMD measurement of a first wavelength ($\lambda_M$), comprising:
    selecting a population of multimode fibers (600);
    performing a DMD measurement for each multimode fiber of the population of multimode fibers at the first wavelength and the second wavelength (604);
        extracting at least one signal feature of the DMD measurement from each multimode fiber of the population of multimode fibers at the first wavelength and the second wavelength,
    the signal feature being at least one of a centroid, mean power, peak power value and position, and root mean square (RMS) width of the DMD measurement at the first wavelength and the second wavelength respectively (608);
    mapping the DMD measurement of the first and second wavelength against the at least one signal feature to determine coefficients of the mapping model (608);
    choosing multimode fibers which meet specified bandwidth requirements at a wavelength lambda $\lambda_S$, from measurements from another wavelength, $\lambda_M$.

2. The method of claim 1 for selecting fibers wherein 900 nm≤$\lambda_S$≤953 nm, from measurements from another wavelength, $\lambda_M$, wherein 830 nm≤$\lambda_S$≤900 nm.

3. The method of claim 1 wherein 900 nm≤$\lambda_S$≤920 nm, from measurements from another wavelength, $\lambda_M$, wherein 830 nm≤$\lambda_S$≤900 nm.

4. A method for selecting fibers by generating a mapping model for use in predicting if the EMB of a multimode fiber (MMF) at an arbitrary wavelength, $\lambda_S$, is equal or greater than a specified bandwidth threshold, $EMB_{th}$, based on a DMD measurement at a different wavelength, $\lambda_M$, comprising:

selecting a population of multimode fibers (600);

performing a DMD measurement for each multimode fiber of the population of multimode fibers at the different wavelength, $\lambda_M$, and the arbitrary wavelength, $\lambda_S$ (604);

extracting at least one signal feature of the DMD measurement from each multimode fiber of the population of multimode fibers at the different wavelength, $\lambda_M$, the signal feature being at least one of a centroid, mean power, peak power value and position, and root mean square (RMS) width of the DMD measurement at the different wavelength, $\lambda_M$, (606);

mapping the DMD measurement of the arbitrary wavelength and different wavelength against the at least one signal feature to determine coefficients of the mapping model (608), wherein the coefficients are determined by an iterative process that maximizes a metric that represents the differences in features in a first group of fibers and a second group of fibers, wherein the first group are composed of MMFs that have $EMB>EMB_{th}$ at the arbitrary wavelength $\lambda_S$ and second group are composed of MMFs that have $EMB<EMB_{th}$ at the arbitrary wavelength $\lambda_S$;

choosing multimode fibers which meet specified bandwidth requirements at a wavelength lambda $\lambda_S$, from measurements from another wavelength, $\lambda_M$.

5. The method of claim 4 wherein 900 nm≤$\lambda_S$≤953 nm, from measurements from another wavelength, $\lambda_M$, wherein 830 nm≤$\lambda_S$≤900 nm.

6. The method of claim 4 wherein 900 nm≤$\lambda_S$≤920 nm, from measurements from another wavelength, $\lambda_M$, wherein 830 nm≤$\lambda_S$≤900 nm.

* * * * *